United States Patent [19]
Lock et al.

[11] 3,936,339
[45] Feb. 3, 1976

[54] IN-LINE PROCESS FOR THE PRODUCTION OF CORRUGATED BOARD

[75] Inventors: James A. Lock, Monroe, N.Y.; Leroy C. Hofmann, Saddle River, N.J.; Chester P. Kulesza, Statesville, N.C.

[73] Assignee: International Paper Company, New York, N.Y.

[22] Filed: May 29, 1973

[21] Appl. No.: 364,547

[52] U.S. Cl. ............... 156/205; 156/210; 427/391; 428/530
[51] Int. Cl.² .......................................... B31F 1/22
[58] Field of Search ............................ 156/205–210, 156/470–472, 77–79; 161/159, 133, 160; 117/155 R, 155 UH, 139.5 CQ, 120, 155 L; 252/307, 305; 427/391, 395; 428/530

[56] References Cited
UNITED STATES PATENTS

| | | | |
|---|---|---|---|
| 3,002,873 | 10/1961 | Pickren | 117/155 L X |
| 3,025,963 | 3/1962 | Bauer | 156/205 X |
| 3,547,854 | 12/1970 | Roth et al. | 117/139.5 CQ X |
| 3,607,598 | 9/1971 | LeBlanc et al. | 161/133 |
| 3,741,854 | 6/1973 | DeGoria | 161/159 X |
| 3,796,599 | 3/1974 | McLaughlin | 117/109 X |

FOREIGN PATENTS OR APPLICATIONS

| | | | |
|---|---|---|---|
| 1,039,540 | 8/1966 | United Kingdom | 117/155 UA X |
| 849,480 | 8/1970 | Canada | |

*Primary Examiner*—Douglas J. Drummond
*Assistant Examiner*—David A. Simmons

[57] ABSTRACT

An efficient, inexpensive, in-line process is provided for producing additive-impregnated corrugated board, such as those having excellent rigid-when-wet and rigid-when-humid strengths. The process comprises applying an additive, such as water- and moisture-resistant resin, flame retardant, fire proofing agent, fungicide, mold-inhibitor, insecticide, or the like, in the form of a collapsible foam of a dispersion or solution of the additive to the corrugated medium, and desirably the liners, at the time the corrugated board is being formed.

18 Claims, 2 Drawing Figures

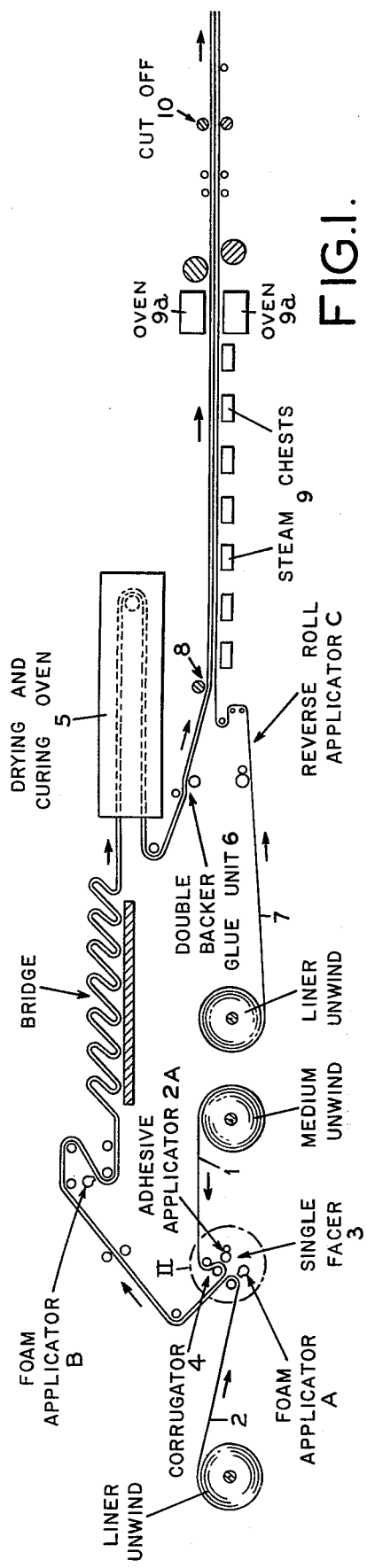
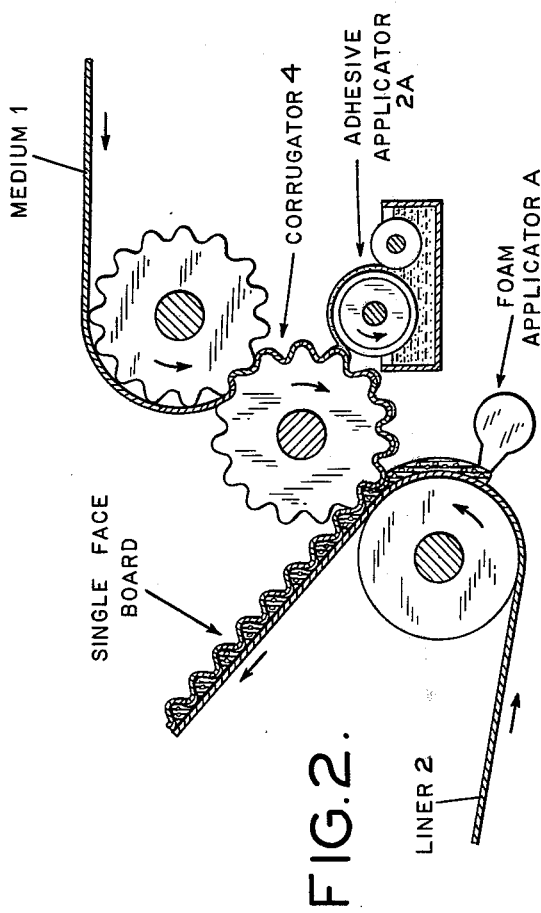

IN-LINE PROCESS FOR THE PRODUCTION OF CORRUGATED BOARD

BACKGROUND OF THE INVENTION

The present invention relates to an inexpensive, efficient, in-line process for incorporation of useful additives during the production of corrugated board. The process is particularly useful in producing corrugated board have excellent rigid-when-wet and rigid-when-humid strengths. Additionally, flame retardants, fire retardants, fungicides, mold inhibitors, insecticides, and the like are readily incorporated into the board in an in-line process. The process comprises applying a collapsible foam of a dispersion or solution of the desired additive to the corrugated medium, and desirably the liners, during in-line assembly of the corrugated board from the corrugated medium and facing liner components.

In the manufacture of corrugated paperboard, it is the practice to form the corrugated assembly by sandwiching a corrugated medium between a pair of spaced-apart linerboards in a corrugating machine. The corrugated paperboard is then cut into sections or into blanks for storage and scored to form containers for shipment of goods therein.

While conventional corrugated paperboard materials have enjoyed a high degree of commercial success, this type of material is normally relatively unsatisfactory when exposed to high-humidity or wet conditions, such as those encountered when shipping produce, dressed poultry, or the like, packed in ice. The exposure of the corrugated board to water and water vapor rapidly deteriorates the corrugated board so that it will completely collapse in a relatively short period of time, or at least lose its strength and rigidity. Also, corrugated board is subject to fire, mold, fungus and insect attack, and the like, and the industry has long sought an efficient means for incorporating additives into corrugated board which will counteract these attacks.

Accordingly, the industry has expended much time and effort to solve the problem. One approach to the solution of the problem of moisture attack has been to impregnate the linerboard and corrugated medium with a wax material to form a water barrier and thereafter fabricate the corrugated container-board. This approach has not been successful because the wax-impregnated linerboard and corrugating medium do not form satisfactory barriers against the encroachment of water vapor into the corrugated board. Therefore, the level of performance has not been all that is to be desired.

Another approach to a solution of this problem has been to form the corrugated board and then impregnate it with a wax. However, this approach has not been entirely satisfactory because water vapor is still able to penetrate the wax coating of the corrugated board. A still further approach has been to utilize a blend of wax-extendible copolymers as a coating for the respective elements of paperboard containers, as described in British Pat. No. 957,933.

Other attempts have also been made to produce corrugated board having enhanced rigid-when-wet or rigid-when-humid strength properties. These attempts have also been less than satisfactory. In general, these methods have involved resin impregnation of completed corrugated board or by impregnation with resin of the medium prior to corrugating and assembly of the corrugated board.

One method of resin-impregnation of finished corrugated board is disclosed in Arian et al. U.S. Pat. application, Ser. No. 54,201, filed July 13, 1970. In that method, liquid impregnating resins are poured into the open ends of finished corrugated boards and allowed to drain out the other ends. Another process for treating finished corrugated board is disclosed in U.S. Pat. No. 3,523,058.

Attempts have been made to employ in-line methods of resin treatment, such as Canadian Pat. No. 849,480, granted Aug. 18, 1970. These have not been satisfactory for commercial processing because of the difficulty in producing a uniformly resin-impregnated corrugated medium.

British Pat. No. 1,039,540 describes a process for coating materials with a foam produced from a coating material. However, the patent makes no suggestion as to how the problems of producing corrugated board having an additive incorporated into the board might be produced.

In general, if resin impregnation is performed prior to fluting the corrugated medium, the medium sticks to the corrugating rolls and board cracking is encountered during manufacture of the board. If resin impregnation is attempted after corrugation, it has not been possible to impregnate the board with any uniformity. Thus prior attempts at in-line resin impregnation have not provided uniform resin impregnation.

SUMMARY OF THE INVENTION

By means of the present invention there is provided an inexpensive, efficient, in-line process for producing corrugated board and incorporating into the board an additive, such as will provide excellent rigid-when-wet and rigid-when-humid strengths, fire retardant, flame retardant, fungicidal, mold inhibiting, insecticidal properties, and the like. Additionally, the resultant corrugated board has excellent test properties when tested for flat crush, short column compression, dry stacking strength, etc. The process provides a corrugated board having components uniformly impregnated with resin.

In accordance with the process, the corrugated medium is impregnated with a collapsible foam of a solution or dispersion of additive, such as liquid water- and moisture-resistant resin, fire retardant, flame retardant, fungicide, mold inhibitor insecticide, etc. Desirably, where the resin is added, it may be thermo-setting or thermo-plastic; preferably thermo-setting. The foam is desirably applied to the conventional single facer of a corrugated board machine at the nip as the first liner and fluted medium meet in the corrugator or at the inside of either of the liner or fluted medium and carried into the nip. In addition, the foam may be applied to the open flutes of the single faced board, the inside of the second liner or at the nip where the second liner and single faced medium meet to form the completed board. The application of the foam to the corrugating medium has been found to provide particularly effective results. Either the first and/or third foam applicators may be replaced by a conventional roll coating applicator.

The process of the invention is applicable to standard corrugating equipment and board-forming equipment. The only additional equipment needed are foamers and applicators to apply the foam to the fluted medium or liner member. Drying and curing ovens can also be used to supplement the heating capacity of the conventional corrugating machine. The foam producers are standard units of apparatus commercially available, such as the Oaks mixer, manufactured by E. T. Oakes Corporation, or the Votator, manufactured by Chemetron Corporation. Both of these units operate by blowing air into the aqueous solution or dispersion of the resin or other additive until a foam of desired density is obtained. The foam is applied to the board with an applicator which consists of a long slit orifice feeding a pond behind a doctor blade. A roll applicator, also commercially available, and a device with those skilled in the art are quite familiar, can be used to apply the resin to the liners.

The process employs standard medium and liner components which are normally employed in the manufacture of corrugated board. The medium to be fluted is desirably an absorbent paper of any type desired, including kraft or semi-chemical fiber. The liner papers may be any of those conventionally employed in forming corrugated board.

A resin-containing foam employed to provide rigid-when-wet properties may be of a solution or dispersion, preferably aqueous, of any of a number of water- or moisture-resistant thermo-setting or thermo-plastic resins. These include:

A. Condensation polymers, thermosetting or not, such as urea-formaldehyde (such as mol ratio of formaldehyde to urea of between 1.5 and 2.0 to 1), melamine-formaldehyde, phenol-formaldehyde, polyesters and polyamides, and addition polymers such as epoxies.

B. Vinyl polymers and copolymers, such as polyvinyl chloride, polyvinylidene chloride, polymethyl methacrylate and other acrylics, butadiene-styrene, acrylonitrile butadiene-styrene (ABS), polyisoprene, polystyrene, polybutadiene, vinyl chloridevinyl acetate copolymer latex, etc.

C. Ethyl cellulose, cellulose acetate, etc.

Indeed, any water-repellent resin which, in aqueous solution or dispersion, can be foamed, may be employed. The amino- and phenolic-aldehyde thermosetting condensation resins are preferred, especially the thermosetting urea-formaldehyde resins. Desirably, from about 10 to 30 lbs. of resin per thousand square foot (M.S.F.) of corrugated board are employed to provide excellent rigid-when-wet properties. For preferred results, from about 16 to 20 lbs./M.S.F. are employed. For lower rigid-when-wet strengths or for resistance to short term moisture exposures or mere humid conditions, lesser amounts of resin may be employed.

The resin is introduced, as a collapsible foam, at successive stages in the process of producing the corrugated board. Desirably, about 6 lbs./M.S.F. of resin are introduced at the time of assembling the fluted medium and the single liner with an additional 10 lbs./M.S.F. being added to the exposed fluted single faced medium prior to introducing the second liner before introducing the components into the double backer. Additionally, 4 lbs./M.S.F. of resin are desirably applied to the second liner before it goes into the double backer.

It is important that the collapsible impregnating foam of the resin have only sufficient stability to fill the voids between the fluted medium and the liner and to remain as a foam until the single faced board is formed and only until introduced into the heated dryer. At the time of introducing into the dryer, the single faced board may contain 20 to 30% and preferably only 23 to 27% water. Water content will depend on resin and adhesive pick up. The introduction of the single faced board into the heated dryer causes the foam to expand substantially and assists in the collapse of the foam and its absorption into the board. If the foam does not collapse prior to any curing of the resin, the resin will cure or set as a foam rather than as an impregnate in the fluted medium and liner. As to the foam introduced at the double backer, sufficient collapsible foam should be added to fill the valleys of the flutes and facing but to collapse when penetrating or impregnating the medium and the liner. In any event, the foam must collapse before the resin is set or cured. The density of the foam is desirably regulated so as to provide for collapse prior to the entry of the single faced medium into the dryer or the double faced board into the final heater.

It is desirable, but not essential, to apply the customary conventional adhesives to the crests of the fluted medium, so as to provide enhanced adherence of the liners to the fluted medium. For this purpose, starch modified with acid-catalyzed urea-formaldehyde resins and/or polyvinyl alcohol may be employed. Other adhesives, such as Staybind, a resorcinol-starch adhesive, or a starch polyvinyl alcohol adhesive may also be employed as the adhesive to be applied to the crests of the medium.

In order to provide drying of the board and collapse of the foams and curing of thermosetting resins with which the medium end liners are impregnated, it is necessary to heat the board at the single faced stage and again at the double backer stage. Heat for this purpose is necessary in order to effect condensation or curing of the resins. The rate of cure depends on the time, temperature and acidity of impregnating resin system. The greater the temperature, and the acidity of the resin foam, the more rapid is the curing rate.

As referred to above, the present in-line process also permits impregnation of corrugated board with other desired additives, such as fire retardants, including phosphates, such as ammonium phosphates, and antimony compounds such as antimony trioxide, mold inhibitors, including copper salts such as copper naphthenate, and insecticides, etc., such as chlordane, fungicides, such as metal salts of dithiocarbamic acid or 2-mercaptobenzothiazole, etc.

It is an object of the invention to provide an efficient economical in-line process for impregnating corrugated board with a desired additive.

It is also an object of the present invention to provide an efficient, economical, in-line process for imparting rigid-when-wet strength to corrugated board.

It is another object of the present invention to provide an in-line process for impregnating corrugated board with an impregnating, collapsible foam of a dispersion of a resin to impart rigid-when-wet strength.

It is a further object of the present invention to provide corrugated board having excellent rigid-when-wet strength uniformly throughout the corrugated board.

Other objects of the present invention will be apparent to those skilled in the art from reading the present disclosure, taken in conjunction with the appended drawings, in which:

FIG. 1 is a diagrammatic flow sheet showing the alignments of the apparatus and treatments which comprise the process.

FIG. 2 is an enlarged section of that portion of the single facer portion of the process indicated by the dotted circle II in FIG. 1, showing in greater detail the operation involved.

While the drawings are directed primarily to illustrate the in-line process of the invention for impregnating corrugated board with a resin, it will be apparent that the same process and apparatus are also employed in impregnating with other additives, merely by incorporating the additive into the foam employed.

DETAILED DESCRIPTION OF PROCESS

A detailed description of the process taken in conjunction with the drawings will now follow.

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 2

In-line Production of Rigid-When-Wet Corrugated Board By Impregnation With A resin An aqueous saturating or impregnating foaming resin dispersion was first prepared by mixing the following:

| Component | Parts by Weight |
|---|---|
| 65% solids urea-formaldehyde resin (Gulf Oil Company resin L-100 having a mol ratio of formaldehyde to urea of 2 to 1) | 200 |
| Pearl starch | 10 |
| Urea | 23.6 |
| Water | 160 |
| Ammonium sulfate (catalyst for resin) | 5 |
| Triton X-100 (alkylated aryl polyether alcohol surfactant) | 8 |
| DN 65 (a non-ionic surfactant produced by Rohm & Haas Company) | 4 |

In preparing the resin dispersion, part of the water was used to dissolve the ammonium sulfate catalyst prior to mixing it with the other components. In the foregoing composition, the purpose of the Triton X-100 surfactant and DN 65 surfactant was to assist in producing foam when air was beat into the aqueous resin dispersion. While not essential, the starch acts as an extender or filler for the resin and a thickener for the resin dispersion. Other fillers, such as wood flour, clay, etc. may be employed.

A collapsible impregnating foam of the resin dispersion was prepared by beating the dispersion while injecting air into it in an Oaks mixer. Sufficient air was injected to provide a foam having a density of between about 2 and 8 lbs., preferably 4 to 8 lbs. per cubic foot; or until the original volume of the resin dispersion was increased by about 8 to 30 times.

A standard corrugated line was modified as shown in the drawing by the addition of two foam applicators shown at A and B and a reverse roll applicator shown at C. The foam applicator, shown in enlargement as A in FIG. 2, is provided with a nozzle, as shown, which is connected with the Oaks mixer or other foam producer, to apply foam, containing additive, to the liner or other component of the corrugated board.

The first applicator A is located at the single faced liner immediately prior to the single facer and the second applicator B is located at the bridge where the single faced medium is carried to the drying oven 5. The reverse roll applicator C is positioned just prior to the double back station 8 between the double back glue unit 6 and the double back station 8.

The foregoing resinous composition was whipped with the incorporation of air in an Oaks mixer (not shown) at each of the two foam applicators A and B to provide a foam having a density of 4 to 8 lbs. per cubic foot of foam.

Employing a corrugator as provided, conventional medium paper sheeting 1 of a weight of about 33 lbs. per M.S.F. and liner paper 2 of a weight of about 69 lbs. per M.S.F. were run through the corrugator at a speed of about 50 to 60 feet per minute.

By means of adhesive applicator 2A there was applied to the tips of the fluted medium an adhesive comprising an aqueous dispersion of polyvinyl alcohol adhesive (comprising an aqueous dispersion of 9% polyvinyl alcohol and 5% starch). The polyvinyl alcohol adhesive is desirable for use with the urea-formaldehyde resin, since it crosslinks with the resin to provide a stronger bond between the liner and the fluted medium and also provides better wet-strength bonds.

The foam previously prepared was applied by the foam applicator A just prior to the single facer 3 and corrugator 4 of the corrugating medium. The foam was applied to the liner in sufficient quantity to provide approximately 6 lbs. of resin per M.S.F. of liner. The foam fills the spaces between the single facing and the corrugating medium. The second foam applicator B then applied additional resin foam to the corrugated side of the single faced material at approximately the depths of the flutes with sufficient amount of foam being employed to provide approximately 10 lbs. of resin per M.S.F. of corrugated medium. The foam treated single faced medium is then passed to and through a dryer and curing oven 5 (as shown in the drawing), which was maintained at a temperature of about 300° to 450°F. at a travel speed of about 50 to 100 ft. per minute so that it has a residence time in the drying and curing oven of about 40–60 seconds. The foam was readily absorbed by the liner and corrugated medium by the time that the single faced medium passes through the initial portions of the drying oven 5 and had thus collapsed before any substantial curing had taken place. This treatment in the oven dries the board and partially cures the resin. The temperatures recommended for the drying oven are desirable since lower temperatures may not provide sufficient drying and curing of the resin and excessively high temperatures may produce scorching of the board.

After passing through the drying oven, additional adhesive of the same composition applied at 2A was applied to the exposed tips of the fluted or corrugated member in the usual manner, at the double backer glue unit 6. Double backer liner 7, then had resin solution with surfactants omitted as described above in an amount of about 4 lbs./M.S.F. of liner applied at reverse roll applicator C. The single faced medium, with its fluted peaks having glue attached and backing liner 7 with resin affixed to the inner surface are brought together at roll 8.

The now double backed medium or board was then passed through the heating zone which comprises a series of steam chests 9 maintained at a temperature of about 300°F. and then finally through another curing oven 9a, as shown. The continuous sheet of corrugated board was then cut into desired sizes at the cut-off 10. The curing of the impregnating resin is essentially completed immediately, some residual curing may take place gradually over a period of a day or so in stacked piles of the sheets of corrugated board.

The resulting product was found to have excellent rigid-when-wet strength.

As pointed out hereinabove, the resin foam is only sufficiently stable that it will collapse rapidly after being applied to the facer liners or fluted member upon impregnating the liners and fluted member. Total collapse takes place prior to passing through more than the initial portion of the drying and curing oven 5.

EXAMPLE 2

In-line Production of Rigid-When-Wet Corrugated Board By Impregnation With A Resin Example 1, above, was repeated except that Triton X-100 and the DN 65 surfactants were replaced with approximately three parts by weight of Scriptset 520, a paper sizing agent sold by the Monsanto Company and which is a styrene-maleic anhydride copolymer.

EXAMPLE 3

In-Line Impregnation With A Resin Foam Employing Also A Defoaming Agent

Example 1, above, was repeated except that there was applied to the foam treated medium, immediately after the application of foam by Foam Applicator B, a mist of substantially 100% tributyl phosphate defoaming agent. This defoaming agent assisted in accelerating the rate of collapse of the foam before the corrugated assembly reached drying and curing oven 5.

EXAMPLE 4

In-Line Production of Rigid-When-Wet Corrugated Board By Impregnation With A Phenolic Resin Example 1, above, was repeated but an aqueous dispersion of a phenolic-aldehyde resin was employed in place of the urea-formaldehyde resin. The initial aqueous dispersion had the following composition:

| Component | Parts by Weight |
|---|---|
| 65% solids phenol-formaldehyde resin having a mol ratio of formaldehyde to phenol of 2 to 1 | 50 |
| Triton X-100 (surfactant) | 3 |
| Water | 50 |

The process of Example 1 was repeated providing a phenol formaldehyde resin impregnated corrugated board having excellent rigid-when-wet characteristics.

EXAMPLE 5

In-Line Impregnation Of A Corrugated Board With An Insoluble Flame-Retardant

Example 1, above, was repeated, employing instead of the resin impregnating dispersion, an aqueous dispersion of a water-insoluble flame retardant, namely, antimony oxide. The initial impregnating dispersion had the following composition:

| Component | Parts by Weight |
|---|---|
| Antimony Oxide | 10 |
| Triton X-100 (surfactant) | 3 |
| Water | 100 |

The procedure of Example 1 was repeated, using the above composition to provide the impregnating foam. Drying of the product was more rapid, employing a temperature of 300°F. for about 2 minutes.

EXAMPLE 6

In-Line Impregnation Of A Corrugated Board With A Soluble Flame-Retardant

Example 1, above, was repeated, employing instead of the resin impregnating dispersion, an aqueous dispersion of a water-soluble flame retardant, namely, diammonium phosphate. The initial impregnating dispersion had the following composition:

| Component | Parts by Weight |
|---|---|
| Diammonium Phosphate | 10 |
| Triton X-100 (surfactant) | 3 |
| Water | 100 |

The procedure of Example 1 was repeated, using the above composition to provide the impregnating foam. Drying of the product employed a temperature of 300°F. for about 2 minutes.

EXAMPLE 7

In-Line Impregnation Of A Corrugated Board With A Fungicide

Example 1, above, was repeated, employing instead of the resin impregnating dispersion, an aqueous dispersion of a fungicide. The initial impregnating dispersion had the following composition:

| Component | Parts by Weight |
|---|---|
| Vancide 51Z (mixture of zinc salts of methyl-dithiocarbamic acid and 2-mercaptobenzothiazole) | 1 |
| Triton X-100 (surfactant) | 1 |
| Water | 100 |

As will be apparent to those skilled in the art, more than one impregnating additive may be employed in producing the corrugated board. Thus by providing two or more additives in the aqueous solution or dispersion from which the impregnating foam is produced, these additives will become impregnated into the corrugated board by the practice of the in-line process of the invention. It is particularly advantageous to incorporate one of the non-resinous impregnating additives along with a rigid-when-wet producing resin. For example, a desirable combination to be used with a urea-formaldehyde impregnating resin is a mold inhibitor or a fire retardant.

It is also believed to be apparent to those skilled in the art that the non-resinous impregnating additives may be employed in widely varying amounts, depending upon the amount which it is desired to impregnate into the corrugated board to achieve the intended property.

As will be apparent from the foregoing, two properties of the foam are essential to achieve satisfactory results. First, the foam must be relatively unstable and collapse within a short time of being applied to the component of the corrugated board. If it does not collapse, it will not be possible to impregnate the board and, if foam contains a resin, especially a thermosetting resin, the resin is likely to set in the curing oven before it can impregnate the board components.

Second, the foam must impregnate and desirably saturate the corrugated medium of the board, and preferably the liners also.

It has been found that a surfactant is desirable in the impregnating foam. The surfactant tends to cause the foam to be absorbed into the components of the board and thereby assists in causing the foam to collapse promptly after application to the liners and medium of the board. Substantially any surfactant will provide beneficial results. Although most of the foregoing examples employ Triton X-100, a preferred surfactant for use in the process of the invention, many other surfactants may be employed, although non-ionic surfactants are preferred. Among the surfactants which may be employed are: alkyl aryl sulfonates, sorbitan fatty acid esters, polyoxyethylene ether, alkyl sulfonates, lauryl alcohol sulfate, etc. However, as demonstrated by Example 2, surfactants are not necessary.

A number of factors will influnece the rapidity with which the foam will collapse. In addition to the composition of the foam, the temperature conditions will influence collapse. The higher the temperature, the more rapid is the collapse. The composition of the foam plays an important part in the time of collapse. Thus, the amount of additive in the foam will play a role; the greater the concentration, usually the more rapid the rate of collapse. The density of the foam is also a factor. The more dense, the more rapid the collapse. The volume of foam applied per area of board is also a factor. The less the volume, the more rapid the collapse. Foam collapse can also be speeded up by incorporating a defoamer, such as tributyl phosphate or a higher alcohol, in the base paper, or where possible, by spraying on a defoamer solution of one of the foregoing.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

We claim:

1. An in-line method of making corrugated paperboard with excellent rigid-when-wet strength and having a corrugated medium and at least one liner attached thereto, which method comprises applying to at least one liner or said corrugated medium a rapidly collapsible foam of a dispersion of a water resistant impregnating resin, bringing said corrugated medium and said liner into adhesive contact with each other, heating the resulting composite to complete collapsing of said foam and to thereby complete the impregnation of said medium with said resin, and finally drying said composite after the completion of the collapse of said foam by further heating.

2. An in-line method according to claim 1 wherein said dispersion contains an additional additive which is a member selected from the class consisting of resins, flame retardants, fire retardants, mold inhibitors, fungicides, and insecticides.

3. An in-line method according to claim 2, wherein the additional additive is a fire retardant.

4. An in-line method according to claim 2, wherein the additional additive is a mold inhibitor.

5. An in-line method according to claim 2, wherein the additional additive is a fungicide.

6. An in-line method according to claim 2, wherein the additional additive is an insecticide.

7. An in-line method according to claim 1, wherein there is also applied to the foam treated medium a defoaming agent to accelerate collapse of the foam.

8. An in-line method according to claim 1 wherein the resin used is a thermosetting resin selected from the group consisting of phenol-aldehyde, urea-aldehyde, and melamine-aldehyde resins.

9. An in-line method according to claim 8 wherein the thermosetting resin is a urea-formaldehyde resin.

10. An in-line method according to claim 1 wherein the resin employed is applied in an amount ranging from about 10 to 30 lbs. per thousand square feet of corrugated board.

11. An in-line method according to claim 1 wherein the resin is subsequently cured.

12. A method according to claim 1 wherein the resin employed is applied in an amount ranging from about 16 to 20 lbs. per thousand square feet of corrugated board.

13. A method according to claim 1 wherein the resin employed is a urea-formaldehyde resin characterized by a mol ratio of about 1.5 and 2.0 to 1 of formaldehyde to urea.

14. A method according to claim 1 wherein the foam has a density of about 2 lbs. to 8 lbs. per cubic foot.

15. A method according to claim 1 wherein the corrugated medium having said foam applied is heated to a temperature of between about 300° to 450°F.

16. A method according to claim 1 wherein the collapsible impregnating foam is applied to the liner.

17. A method according to claim 1 wherein the collapsible impregnating foam is applied to the corrugating medium.

18. A method according to claim 1 wherein the foam has a volume of from about 8 to 30 times the original volume of the resin dispersion.

* * * * *

UNITED STATES PATENT OFFICE
CERTIFICATE OF CORRECTION

PATENT NO. : 3,936,339

DATED : February 3, 1976

INVENTOR(S) : James A. Lock et al.

It is certified that error appears in the above-identified patent and that said Letters Patent are hereby corrected as shown below:

Column 5, line 22, "EXAMPLE 2" should be -- EXAMPLE 1 --.

Signed and Sealed this eleventh Day of May 1976

[SEAL]

Attest:

RUTH C. MASON
Attesting Officer

C. MARSHALL DANN
Commissioner of Patents and Trademarks